(12) United States Patent
Gotoh (10) Patent No.: US 6,543,860 B2
(45) Date of Patent: Apr. 8, 2003

(54) HYDRAULIC PRESSURE BRAKE DEVICE (75) Inventor: Yuji Gotoh, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/988,664

(22) Filed: Nov. 20, 2001

(65) Prior Publication Data
US 2002/0060110 A1 May 23, 2002

(30) Foreign Application Priority Data

Nov. 20, 2000 (JP) ...................................... 2000-353197

(51) Int. Cl.7 .................................................. B60T 8/44
(52) U.S. Cl. .................................. 303/114.3; 303/113.3
(58) Field of Search ........................... 303/114.1, 113.1, 303/113.3, 114.2, 114.3; 60/576, 556, 567, 581, 568

(56) References Cited

U.S. PATENT DOCUMENTS

| 3,910,048 A | * | 10/1975 | Gardner ........................ 60/568 |
| 4,225,022 A | * | 9/1980 | Belart ......................... 188/348 |
| 4,611,858 A | * | 9/1986 | Belart ......................... 303/6.01 |
| 4,641,891 A | * | 2/1987 | Belart ........................... 303/10 |
| 4,745,750 A | * | 5/1988 | Belart ........................ 60/547.1 |
| 4,759,591 A | * | 7/1988 | Reinartz et al. .......... 303/116.1 |
| 4,867,509 A | * | 9/1989 | Maehara et al. ........ 303/122.01 |
| 4,950,027 A | * | 8/1990 | Reinartz et al. .......... 303/113.3 |
| 5,098,172 A | * | 3/1992 | Maehara ................... 303/114.1 |
| 6,352,316 B1 | * | 3/2002 | Oka et al. ................... 30/114.3 |
| 6,386,648 B1 | * | 5/2002 | Wasson .................... 303/114.3 |

* cited by examiner

Primary Examiner—Christopher P. Schwartz
Assistant Examiner—Devon Kramer
(74) Attorney, Agent, or Firm—Burns, Doane, Swecker & Mathis, LLP (57) ABSTRACT

A hydraulic pressure brake device includes a master cylinder, a brake operating member, a master piston, a booster, a first auxiliary piston, a pressure transmitting chamber, a valve device, and a second auxiliary piston. The hydraulic pressure brake device further includes an output member and a rod. The output member is provided in the booster for transmitting the boosting power generated by the booster to the first auxiliary piston when the movement of the master piston is assisted by the booster. The rod is provided in the second auxiliary piston for transmitting the operating force applied to the brake operating member to the valve device and for opening the valve device when the movement of the master piston is not assisted by the booster.

15 Claims, 5 Drawing Sheets

HYDRAULIC PRESSURE BRAKE DEVICE

This application is based on and claims priority under 35 U.S.C. §119 with respect to Japanese Patent Application 2000-353197 filed on Nov. 20, 2000, the entire content of which is incorporated herein by reference.

FIELD OF THE INVENTION

This invention generally relates to a hydraulic pressure brake device for a vehicle. More particularly, the present invention pertains to a hydraulic pressure brake device provided with an assisting device (booster) for assisting the movement of a master cylinder in response to brake pedal operation.

BACKGROUND OF THE INVENTION

Figure 4:
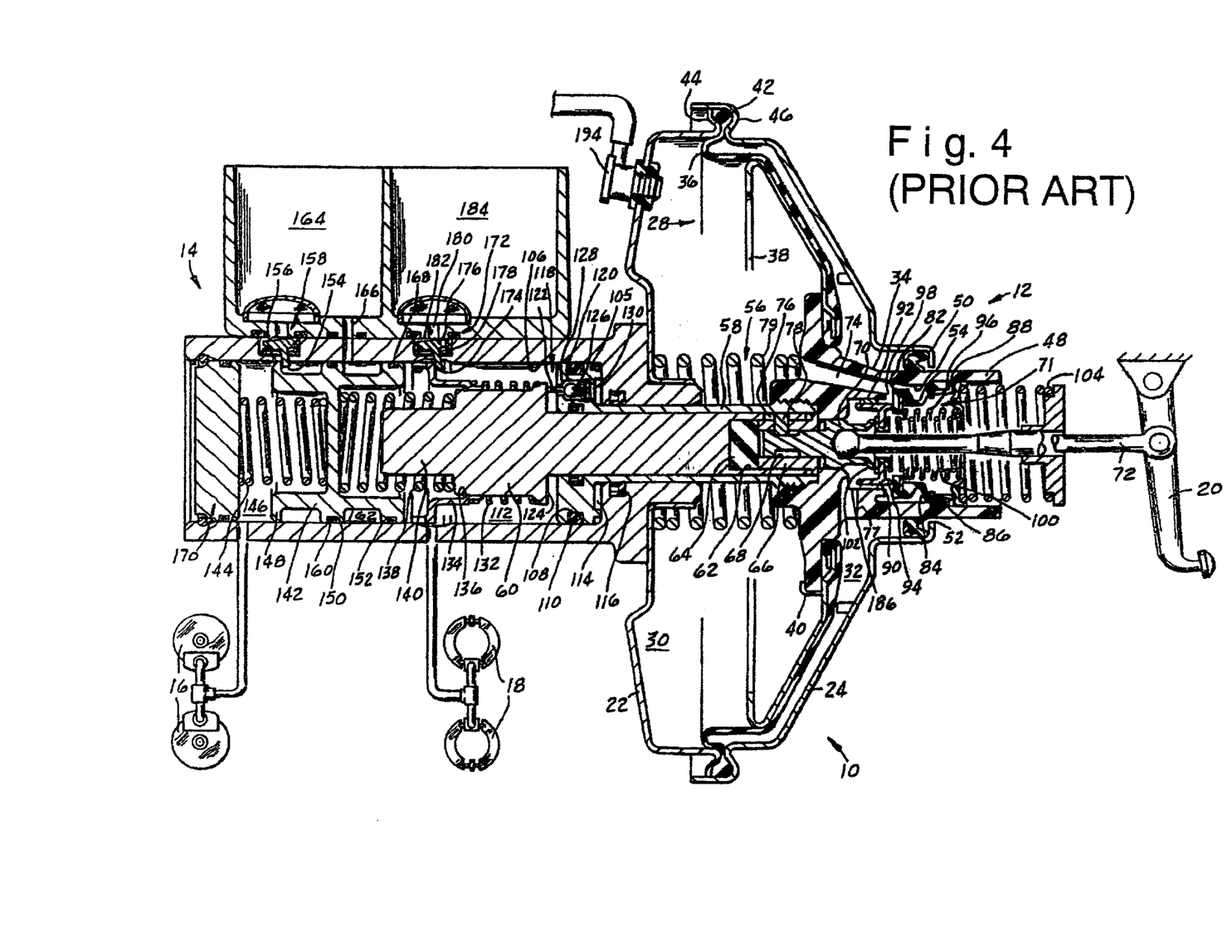
FIG. 4 is a cross-sectional view of a known power braking system having a servomotor.

U.S. Pat. No. 3,910,048 discloses a servomotor for use in a power braking system. As illustrated in FIG. 4, the servomotor 12 is provided with a pressure ratio changer. The servomotor 12 is further provided with a first piston 58 and a second piston 60 for transmitting an operative force to a master cylinder. The first piston 58 is connected to a wall 28 moved by a pressure differential. The second piston 60 is coaxially disposed within the first piston 58 and serves to transmit the input force which drives a control valve 71 for producing the pressure differential. The second piston 60 also operates a hydraulic lock valve 118 disposed within the master cylinder. When the first and second pistons 58, 60 are moved together in response to the movement of the wall 28, fluid is introduced into a lock chamber 114 via the lock valve 118. When the output force generated by the pressure differential reaches the maximum level, the simultaneous movement of the first and second pistons 58, 60 ceases. Further manual force input by the operator will move the second piston 60 disposed within the first piston 58 to close the lock valve 118 and hold the hydraulic fluid within the lock chamber 114 to prevent the first piston 58 from moving.

More particularly, when the first and second pistons 58, 60 are moved forward, hydraulic pressure is generated in each hydraulic pressure chamber 112, 146. The output from the first and second pistons 58, 60 follows a line 188 (shown in FIG. 5) until a second chamber 32 in the servomotor 12 reaches the atmospheric pressure level. At point 190 in FIG. 5, the input force from a brake pedal 20 is transmitted via a plunger 70 and a sleeve 66 to the second piston 60, wherein the second piston 60 is independently moved and a spring 130 is permitted to close a fluid passage 120. When the second piston 60 is further moved under the above-described condition, the output follows the line 192 in FIG. 5.

In the event the vacuum is unavailable, the second piston 60 is moved within the first piston 58 in response to the input force applied to a brake pedal 20, whereby the fluid passage 120 is immediately closed by the valve 118. The output under the above-described condition follows the line 196 in FIG. 5 which shows that a larger output can be generated than the output which can be generated when the first and second pistons 58, 60 are moved simultaneously under no power hydraulic pressure, which is represented by the line 195 in FIG. 5.

Figure 5:
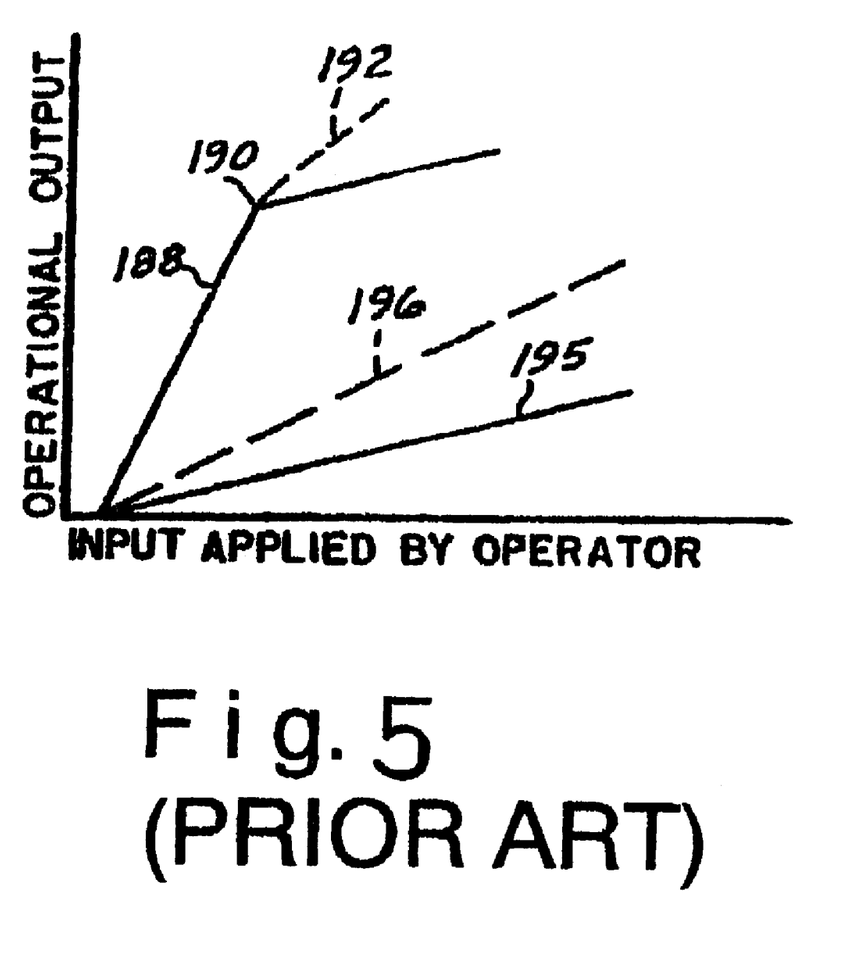
FIG. 5 is a graph showing the operational output as a function of the pedal input according to the known power braking system shown in FIG. 4.

According to the servomotor 12 disclosed in the above U.S. Pat. No. 3,910,048, when the increased hydraulic pressure is locked in the lock chamber 114, the output follows the line 192 beyond a point 190 of the input force applied to the brake pedal 20 as shown in FIG. 5. When the assisting device malfunctions, including the case of no negative pressure or vacuum, the output follows the line 196 corresponding to the movement of the second piston 60 disposed within the first piston 58.

To achieve the operation described above, the servomotor 12 requires extensive modifications as compared to known servomotors to assure sufficient movement of the second piston 60 relative to the first piston 58. This may require re-designing the entire hydraulic pressure brake device, thus causing an increase in the cost associated with manufacturing the hydraulic pressure brake device. Further, a large diameter portion of the first piston 58 is slidably and movably disposed in a hydraulic pressure chamber of the master cylinder. The first piston 58 is slidably movable in an inner bore at a rear side of the master cylinder. Therefore, the above-described construction may result in an increase in the resistance by the sliding movement at the slidably moving portion.

Accordingly, the disclosed hydraulic pressure brake device is susceptible of certain improvements with respect to minimizing the required modifications of the assisting device to substantially maintain the master cylinder under a predetermined structure so as to assure desired input/output characteristics when the assisting device malfunctions. A need also exists for a hydraulic pressure brake device which is not as susceptible to difficulties associated with sliding movement at each slidably moving portion to thus improve the brake pedal operation feeling.

SUMMARY OF THE INVENTION

A hydraulic pressure brake device includes a master cylinder, a brake operating member, a master piston, a booster, a first auxiliary piston, a pressure transmitting chamber disposed between the first auxiliary piston and the master piston, a valve mechanism, and a second auxiliary piston. The master piston is provided in the master cylinder and is moved forward in response to an input force applied to the brake operating member. The booster is provided between the master cylinder and the brake operating member and assists the movement of the master piston in response to the input force applied to the brake operating member. The first auxiliary piston is disposed behind the master piston in the master cylinder and has a larger effective cross-sectional area than the effective cross-sectional area of the master piston. The valve mechanism is disposed in the first auxiliary piston for hydraulically sealing the pressure transmitting chamber when the movement of the master piston is assisted by the booster and for connecting the pressure transmitting chamber with a reservoir when the movement of the master piston is not assisted by the booster. The second auxiliary piston is disposed between the first auxiliary piston and the booster for transmitting the boosting power generated by the booster to the first auxiliary piston when the movement of the master piston is assisted by the booster, for transmitting the input force applied to the brake operating member to the valve mechanism, and for opening the valve mechanism when the movement of the master piston is not assisted by the booster.

The hydraulic pressure brake device also includes an output member and a rod. The output member is provided in the booster for transmitting the boosting power generated by the booster to the first auxiliary piston when the movement of the master piston is assisted by the booster. The rod is provided in the second auxiliary piston for transmitting the input force applied to the brake operating member to the valve mechanism and for opening the valve mechanism when the movement of the master piston is not assisted by the booster.

According to another aspect of the invention, a hydraulic pressure brake device includes a master cylinder, a brake operating member, a master piston provided in the master cylinder and movable in a forward direction in response to an input force applied to the brake operating member, a vacuum booster provided between the master cylinder and the brake operating member to assist the movement of the master piston in response to the input force applied to the brake operating member, a first auxiliary piston possessing a front portion disposed in the rearward opening bore of the master piston and having a larger effective cross-sectional area than the effective cross-sectional area of the master piston, a pressure transmitting chamber defined between the first auxiliary piston and the master piston, and a valve member disposed in a bore in the first auxiliary piston and engageable with a valve seat when the movement of the master piston is assisted by the vacuum booster to hydraulically seal the pressure transmitting chamber and disengageable from the valve seat when the movement of the master piston is not assisted by the vacuum booster for connecting the pressure transmitting chamber with a reservoir. A second auxiliary piston disposed between the first auxiliary piston and the vacuum booster to transmit the boosting power generated by the vacuum booster to the first auxiliary piston when the movement of the master piston is assisted by the vacuum booster and to transmit the input force applied to the brake operating member to the valve member to disengage the valve member from the valve seat when the movement of the master piston is not assisted by the vacuum booster.

BRIEF DESCRIPTION OF THE DRAWING FIGURES

The foregoing and additional features and characteristics of the present invention will become more apparent from the following detailed description considered with reference to the accompanying drawing figures.

DETAILED DESCRIPTION OF THE INVENTION

Figure 1:
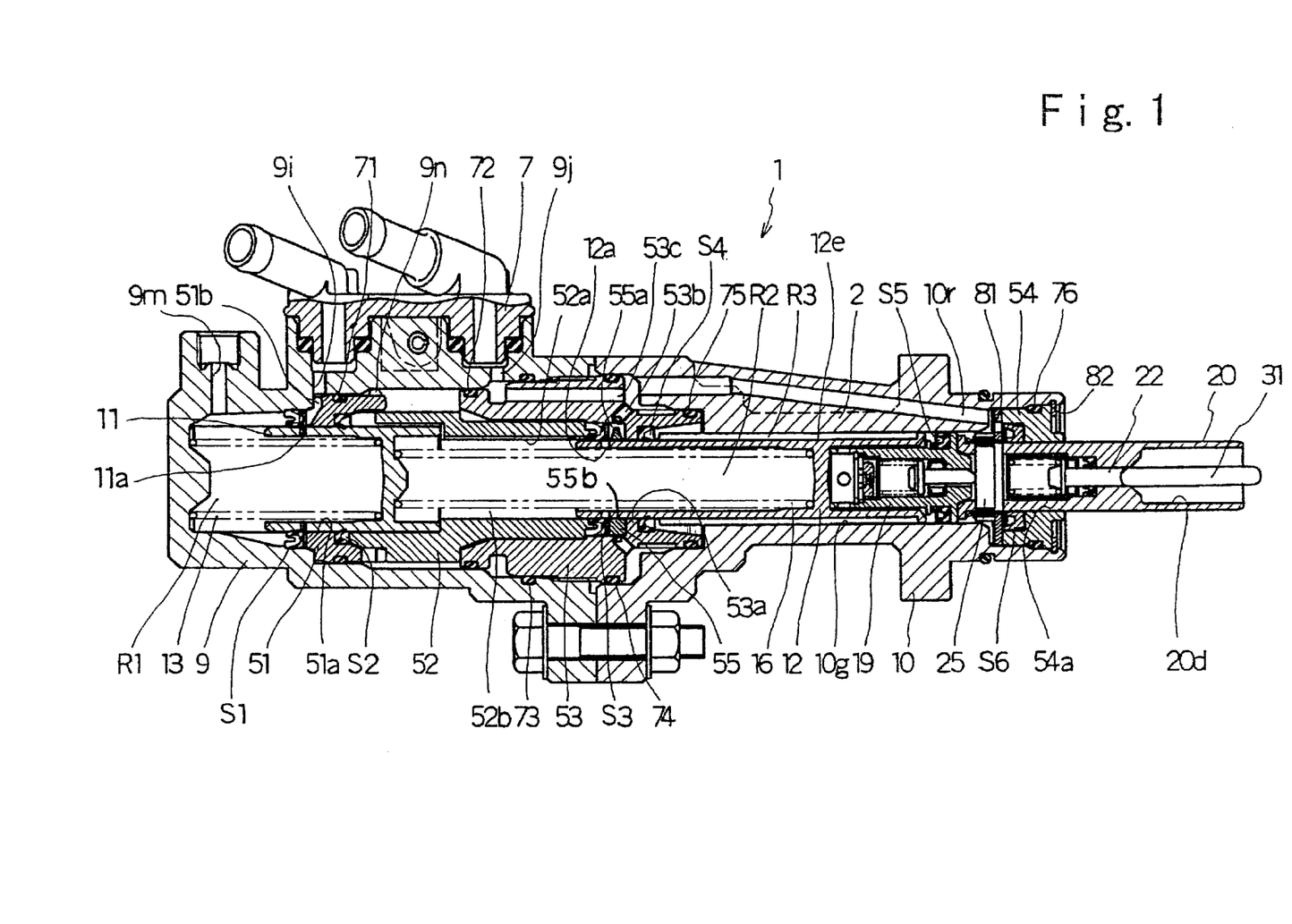
FIG. 1 is a cross-sectional view of a master cylinder for a hydraulic pressure brake device according to an embodiment of the present invention.
Figure 2:
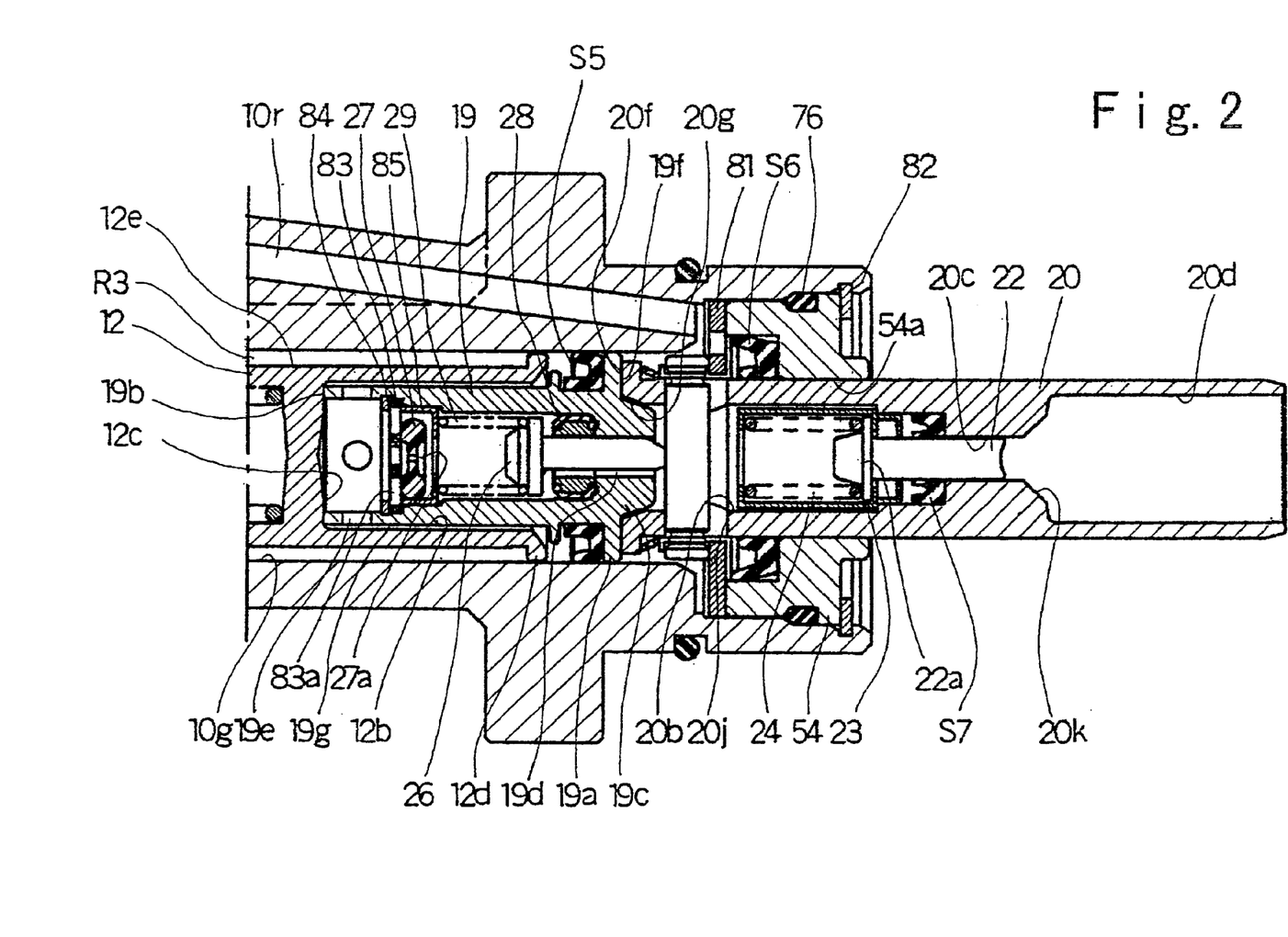
FIG. 2 is an enlarged cross-sectional view of a portion of the master cylinder illustrated in FIG. 1.
Figure 3:
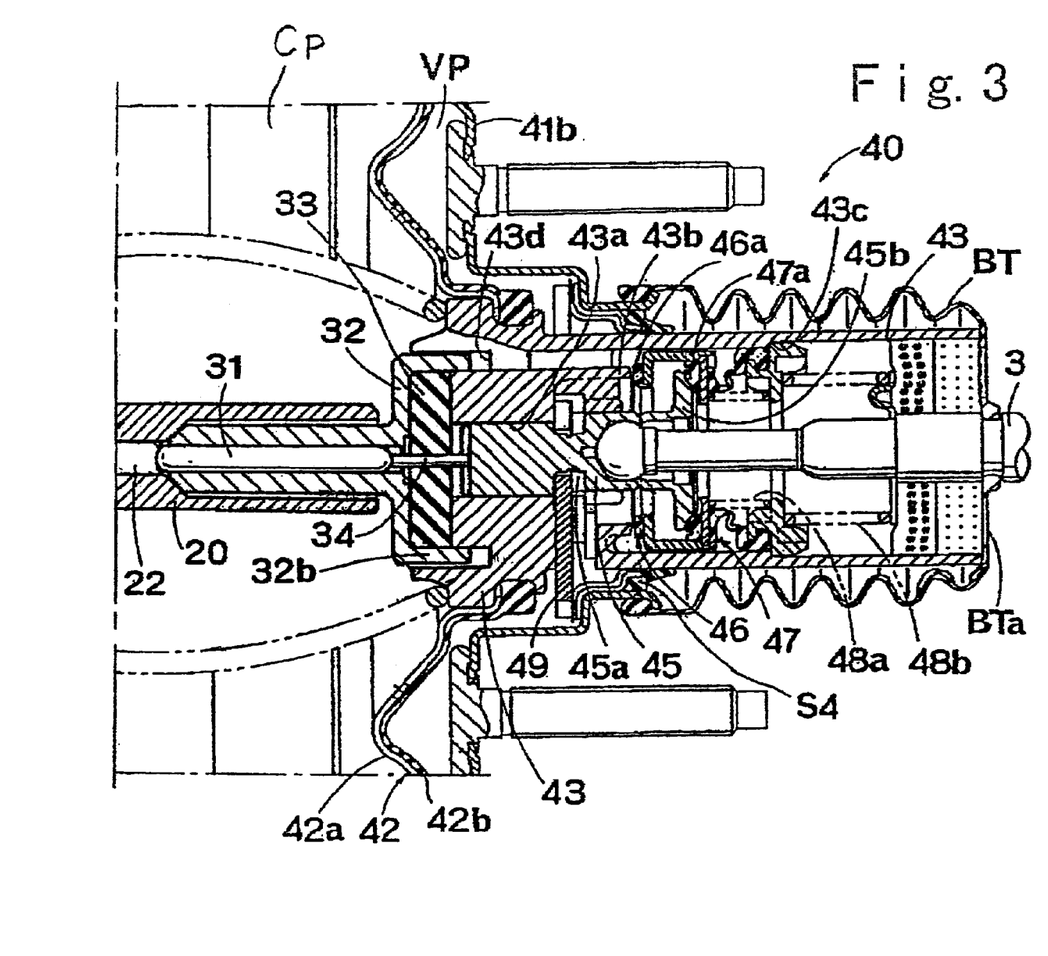
FIG. 3 is a cross-sectional view of a negative pressure booster employed in the present invention.

Referring to FIGS. 1–3, a hydraulic pressure brake device according to an embodiment of the present invention is primarily comprised of a master cylinder 1 which is shown in FIGS. 1 and 2, and a negative pressure booster 40 which is depicted in FIG. 3. The depressing force applied to a brake pedal is transmitted to the booster 40 via an input rod 3 as a brake operating force. The brake operating force is boosted by the booster 40, and hydraulic brake pressure is thus outputted from the mater cylinder 1 in response to the boosted brake operating force. The hydraulic brake pressure is supplied to wheel brake cylinders which are each operatively mounted on one of the wheels of the vehicle.

The master cylinder 1 includes a first master piston 11, a second master piston 12, a first auxiliary piston 19, and a second auxiliary piston 20. The four pistons 11, 12, 19, 20 are arranged in series in a cylinder housing formed of a body 9 and a cap 10 which are connected together. The cylinder housing of the master cylinder 1 further includes a first guiding member 51, a second guiding member 52, a supporting member 53 for the second guiding member 52, and a third guiding member 54. The guiding members 51, 52, 54, and the supporting member 54 are each formed as a cylindrically shaped structure.

The first guiding member 51 supports the first master piston 11 for axial sliding movement. The second guiding member 52 supports the second piston 12 for axial sliding movement. The supporting member 53 also supports the second piston 12 for axial sliding movement. The third guiding member 54 supports the second auxiliary piston 20 for axial sliding movement. The second piston 12 supports the first auxiliary piston 19 for axial sliding movement.

The body 9 is in the form of a cylindrically shaped structure having a bottom portion with a closed end. The body 9 is also provided with a stepped bore having bore diameters that increase sequentially in the rearward direction towards the rearwardly located opening portion of the body 9. The body 9 is also provided with a fluid supply port 9i, a fluid supply port 9j, an outlet port 9m, and an outlet port 9n that are formed in the body 9. The outlet port 9m communicates with a first pressure chamber R1, and the outlet port 9n communicates with a second pressure chamber R2.

The cap 10 is in the form of a cylindrically shaped structure and includes a cylinder bore 10g. The bore diameter of the cylinder bore 10g is larger than the bore diameter of the cylinder bore 52a in the second guiding member 52 and is larger than the bore diameter of the cylinder bore 55b in a guiding member 55. A fluid passage 10r is formed in a side surface of the cap 10.

The first guiding member 51 is disposed via an O-ring 71 in the rearward opening bore of the body 9. A communicating groove 51b is defined in a radial direction of the first guiding member 51. An annular cup-like sealing member S1, S2 is disposed at each of the open ends of the axially extending inner bore in the first guiding member 51. The first pressure chamber R1 is defined by the closed bottom end of the body 9, the first master piston 11, and the sealing member S1. When the brake operation is not performed, the communicating groove 51b communicates with the first pressure chamber R1 via a communicating hole 11a formed in the first master piston 11. A return spring 13 is provided between the bottom end portion of the forward opening bore of the first master piston 11 and the bottom end portion of the rearward opening bore of the body 9 to bias the first master piston 11 in the rearward direction.

The front end of the second guiding member 52 is disposed in the rearward opening bore of the first guiding member 51. The supporting member 53 is disposed coaxially with the body 9 and the cap 10. The rear end of the second guiding member 52 is disposed in the forward opening bore of the supporting member 53. Therefore, the position of the second guiding member 52 in the radial direction relative to the body 9 is determined.

Further, the forward opening bore of the second guiding member 52 includes a stepped portion that comes in contact with the rear surface of the first master piston 11 to limit the rearward movement of the first master piston 11. A return spring 16 is provided between the rearwardly facing bottom surface of the rearward opening bore of the first master piston 11 and the bottom portion of the forward opening bore of the second master piston 12 to bias the second master piston 12 in the rearward direction.

A central outer peripheral portion of the supporting member 53 is disposed in the bore of the body 9 via an O-ring 73. Further, the central outer peripheral portion of the supporting member 53 is disposed in the forward opening bore of the cap 10 via an O-ring 74. The outer peripheral portion of the front portion of the guiding member 53 is disposed in the rearward opening bore of the body 9 via an O-ring 72. The outer peripheral portion of the rearward portion of the supporting member 53 is disposed in the forward opening bore of the cap 10 via an O-ring 75.

The guiding member 55 is provided with a communicating groove 55a extending in the radial direction and is disposed at a stepped portion in the forward opening bore of the supporting member 53. An annular cup-like sealing member S3 is disposed ahead of or forward of the guiding member 55. The communicating groove 55a communicates with a reservoir via a communicating hole 53b, a communicating hole 53c, the fluid supply port 9j, and a connector 7. When brake operation is not performed, the communicating groove 55a further communicates with the second pressure chamber R2 via a communicating hole 12a formed in the second master piston 12. The second pressure chamber R2 is defined by the first master piston 11, the sealing member S2, the first guiding member 51, the O-ring 71, the body 9, the O-ring 72, the supporting member 53, the sealing member S3, and the second master piston 12.

As shown in FIG. 2, the first auxiliary piston 19 is provided with a large diameter flange portion 19a. An annular cup-like sealing member S5 is disposed at the front surface of the large diameter flange portion 19a. The cylinder bore 10g axially and slidably supports the large diameter flange portion 19a and the annular cup-like sealing member S5. A third pressure chamber R3 is defined by the second master piston 12, an annular cup-like sealing member S4 (shown in FIG. 1), the supporting member 53, the O-ring 75, the cap 10, and the sealing member S5. The bore diameter of the cylinder bore 10g is designed to be larger than the bore diameter of the cylinder bore 55b of the guiding member 55 supporting the second master piston 12. A clearance is defined between the inner periphery of the cylinder bore 10g and a rear flange portion 12d of the second master piston 12. Brake fluid can thus circulate between the inner periphery of the cylinder bore 10g and the outer periphery of the rear flange portion 12d.

The third guiding member 54 is disposed in the rearward opening bore of the cap 10 via an O-ring 76. An annular cup-like sealing member S6 is disposed in a forward opening bore of the third guiding member 54. The second auxiliary piston 20 is axially and slidably supported by a guiding portion 54a of the third guiding member 54. A snap ring 82 determines the rearward movement limit of the third guiding member 54 relative to the cap 10.

A pin 25 (labeled in FIG. 1) is disposed in a radially directed hole 20j of the second auxiliary piston 20. The third guiding member 54 comes in contact with the pin 25 via a plate 81 that is disposed forward of the third guiding member 54. Therefore, the rear movement limit of the second auxiliary piston 20 relative to the cap 10 is determined.

As shown in FIGS. 1 and 2, a cylindrical portion 19g at the front portion of the first auxiliary piston 19 is disposed in the rearward opening bore 12b of the second master piston 12 with a predetermined clearance in the radial direction relative to the rearward opening bore 12b. A rear cone-shaped table portion 19c (a rear portion) of the first auxiliary piston 19 is disposed in the forward opening bore 20g of the second auxiliary piston 20 with a clearance. The rear end surface 19f of the large diameter flange portion 19a comes in contact with the front end surface 20f of the second auxiliary piston 20. The rearward movement limit of the second auxiliary piston 20 is determined by the third guiding member 54 via the pin 25 and the plate 81. The rearward movement limit of the first auxiliary piston 19 is determined by the third guiding member 54. The front end surface 19b of the first auxiliary piston 19 comes in contact with the bottom end portion 12c of the rearward opening bore 12b of the second master piston 12. The front end surface 19b of the first auxiliary piston 19 receives the biasing force of the return spring 16 which pushes or urges the second master piston 12 in the rearward direction. A sealing portion is shaped at the rear end of the third pressure chamber R3 by the sealing member S5, the large diameter flange portion 19a, and the cylinder bore 10g of the cap 10.

A cylindrical valve seat member 28 is disposed at the rear portion of the forward opening bore of the first auxiliary piston 19. A valve member 26 is biased in the rearward direction by a valve spring 29 and is arranged so that a portion of the valve member 26 penetrate a rearward opening bore 19d of the first auxiliary piston 19 and a cylindrical portion of the valve seat member 28. When the brake operation is not performed as shown in FIG. 2, the rear end surface of the valve member 26 comes in contact with the pin 25. Therefore, the valve member 26 and the valve seat member 28 are mutually separated from one another in the axial direction, whereby a valve mechanism is opened.

A spring retainer 85 and a plate 83 provided with holes are disposed in the forward opening bore of the first auxiliary piston 19 and are blocked by a snap ring 84 so as not to come out of the set position. A valve member 27 having an orifice 27a is disposed in a space defined between the plate 83 and the spring retainer 85. When brake fluid is applied to the valve member 27 from the left-hand side, a rear end surface of the valve member 27 comes in contact with the front end surface of an inner flange portion of the spring retainer 85, whereby a throttle effect is achieved. On the other hand, when brake fluid is applied to the valve member 27 from the right-hand side, the rear end surface of the valve member 27 is separated from the front end surface of the inner flange portion of the spring retainer 85 so that the throttle effect is not performed.

When the brake operation is not performed as shown in FIG. 2, the third pressure chamber R3 communicates with the reservoir via a radially directed clearance between the cylindrical portion 19g of the first auxiliary piston 19 and the rearward opening bore 12b of the second master piston 12, a radially directed hole 19e of the first auxiliary piston 19, the holes of the plate 83, the rearward opening bore 19d of the first auxiliary piston 19, the radially directed hole 20j of the second auxiliary piston 20, and the fluid passage 10r of the cap 10.

As shown in FIG. 3, an output member 32 of the negative pressure booster 40 and a rod 31 penetrating the axial center of the output member 32 are disposed in the rearward opening bore 20d of the second auxiliary piston 20. The tip end portion of the output member 32 comes in contact with an inclined portion 20k of the second auxiliary piston 20.

Referring back to FIG. 2, a plunger 22 is axially and slidably supported via an annular cup-like sealing member S7 in an opening bore 20c of the second auxiliary piston 20. The rear end surface of the plunger 22 is engageable with a front ball surface of the rod 31. The retainer 23 is an approximately cylindrically shaped structure provided with a forward flange portion and a rear flange portion. The retainer 23 is disposed in the forward opening bore 20b of the second auxiliary piston 20, and is axially and slidably movable relative to the plunger 22. The flange portion 22a of the plunger 22 is disposed in the retainer 23. A return spring 24 is provided between the front surface of the flange portion 22a of the plunger 22 and the rear end surface of the forward flange portion of the retainer 23 to bias the flange portion 22a of the plunger 22 in the rearward direction relative to the retainer 23. When the brake operation is not performed as shown in FIG. 2, the rear end surface of the flange portion 22a is in contact with the front surface of the rear flange portion of the retainer 23. Under the above-described condition, the return spring 24 is provided at a predetermined mounting position to have a predetermined set load. The front surface of the forward flange portion of the retainer 23 is engageable with the rear end portion of the pin 25.

As shown in FIG. 3, the negative pressure booster 40 includes a constant pressure chamber CP connected to a negative pressure source and a variable pressure chamber VP located rearwardly of the constant pressure chamber CP. A brake pedal depressing force is transmitted to control a valve mechanisms 46, 47 via the input rod 3. When a depressing force is applied to the brake pedal, the variable pressure chamber VP selectively communicates with the constant pressure chamber CP and the atmospheric air. A boosting force generated by the pressure differential between the constant pressure chamber CP and the variable pressure chamber VP is transmitted to the output member 32 via a power piston 43 and a reaction force member 33. Further, the depressing force applied to the brake pedal by the driver is transmitted to the output member 32 via a plunger 45, a key member 49, the power piston 43, and the reaction force member 33.

Generally speaking, the operation of the negative pressure booster 40 is similar to known types of negative pressure boosters and so a detailed description of the operation of the booster is not included for purposes of simplification. The negative pressure booster 40 according to the disclosed embodiment of the present invention differs structurally from many known negative pressure boosters in that a pin 34 and the rod 31 are provided for transmitting only the brake pedal depressing force to the master cylinder 1.

The normal boosting operation of the negative pressure booster 40 in conjunction with the master cylinder is as follows, with a boosting power being generated depending on predetermined input/output characteristics. When a brake pedal depressing force is applied to the input rod 3, boosting power is generated in response to the pressure differential between the variable pressure chamber VP and the constant pressure chamber CP. The boosting power is transmitted to the inclined portion 20k of the rearward opening bore 20d of the second auxiliary piston 20 via the power piston 43, the reaction force member 33 and the output member 32. The second auxiliary piston 20 is moved forward (i.e., to the left in FIG. 2) and the pin 25 moves in the rear direction relative to the forward movement of the second auxiliary piston 20. Therefore, corresponding to the rearward movement of the pin 25, the valve member 26 is moved in the rearward direction and thus comes in contact with the valve seat member 28. Thus, a valve mechanism formed by the valve member 26 and the valve seat member 28 is closed. Therefore, communication between the third pressure chamber R3 and the reservoir is interrupted, and the third pressure chamber R3 becomes a hydraulically sealed space. When the brake pedal is depressed under the above described condition, the first auxiliary piston 19 in contact with the second auxiliary piston 20 at the rear end surface 19f is moved forward corresponding to the forward movement of the second auxiliary piston 20.

The effective area of the first auxiliary piston 19, i.e., the area to push the brake fluid, is the area of the cylinder bore 10g sealed by the sealing member S5. The effective area of the second master piston 12, i.e., the area to push the brake fluid, is the area of the cylindrical portion 12e sealed by the sealing member S4. The amount of brake fluid pushed by the first auxiliary piston 19 is equal to the amount of brake fluid pushed by the second master piston 12 in the hydraulically sealed third pressure chamber R3. The effective area of the first auxiliary piston 19 is larger than the effective area of the second master piston 12. Therefore, the more the first auxiliary piston 19 is moved forward, the more the second master piston 12 is separated from the first auxiliary piston 19. That is, while the first auxiliary piston 19 is hydraulically connected to the second master piston 12 and the pistons 19, 20 are respectively moved by a different stroke, the second pressure chamber R2 is supplied with the hydraulic brake pressure corresponding to the effective area of the first auxiliary piston 19.

The operation of the negative pressure booster 40 after the force generated by the booster 40 reaches the maximum level is as follows. When the boosting force generated by the negative pressure booster 40 is beyond a threshold of the booster, i.e., when the inner space of the variable pressure chamber VP reaches the atmospheric pressure level, the boosting force of the booster 40 can no longer increase. When the brake pedal is depressed by the driver under the above-described condition, the input rod 3 is moved forward in response to the input force applied to the brake pedal. Further, the plunger 45, the pin 34, the rod 31 and the plunger 22 are thus moved forward. When the plunger 22 and the retainer 23 come in contact with the pin 25 as a unit, the rearward pushing force of the hydraulic brake pressure in the third pressure chamber R3 is applied to the valve member 26. The rearward pushing force is larger than the biasing force of the spring 24. Therefore, even when the retainer 23 comes in contact with the pin 25, the valve member 26 is maintained to be in contact with the valve seat member 28. That is, even when the boosting force generated by the negative pressure booster 40 is beyond the threshold value, the brake pedal depressing force by the driver is transmitted to the first auxiliary piston 19, whereby the hydraulic brake pressure is outputted corresponding to the effective area of the first auxiliary piston 19.

The operation of the negative pressure booster 40 under the condition that the boosting power generated by the booster 40 does not correspond to the predetermined input/output characteristics or under the condition that the booster 40 malfunctions and generates no boosting power is as follows. When the negative pressure booster 40 malfunctions, the input rod 3 is moved forward in response to the brake pedal operation with no forward movement of the output member 32. Corresponding to the forward movement of the input rod 3, the second auxiliary piston 20 is moved forward integrally with the first auxiliary piston 19 and the second master piston 12. The rod 31 and the plunger 22 are moved forward relative to the second auxiliary piston 20, wherein the retainer 23 moved integrally with the plunger 22 comes in contact with the pin 25 and pushes the pin 25 in the forward direction. The biasing force of the return spring 24 is larger than the rearward biasing force of the valve spring 29, and the valve member 26 is thus separated from the valve seat member 28. Therefore, the third pressure chamber R3 communicates with the reservoir via the radially directed clearance between the cylindrical portion 19g of the first auxiliary piston 19 and the rearward opening bore 12b of the second master piston 12, the radially directed hole 19e of the first auxiliary piston 19, the holes of the plate 83, the rearward opening bore 19d of the first auxiliary piston 19, the radially directed hole 20j of the second auxiliary piston 20j, and the fluid passage 10r of the cap 10. The third pressure chamber R3 thus reaches an atmospheric pressure level.

As described above, when the negative pressure booster 40 malfunctions, the second auxiliary piston 20 is moved forward integrally with the first auxiliary piston 19 and the second master piston 12. The hydraulic brake pressure outputted from the master cylinder 1 under this condition does not correspond to the effective area of the fist auxiliary piston 19, but corresponds to the effective area of the second master piston 12. The effective area of the second master piston 12 is smaller than the effective area of the first auxiliary piston 19, wherein the hydraulic brake pressure generated in the second pressure chamber R2 is increased if the brake pedal depressing force is identical with the input force applied to the second auxiliary piston 20. Therefore, the pressure increasing gradient of the present invention when the booster 40 malfunctions is larger than the pressure increasing gradient of known hydraulic pressure brake devices. A large controlling force is thus assured by the hydraulic pressure brake device according to the disclosed embodiment of the present invention.

According to the hydraulic pressure brake device provided with the above-described construction, the booster 40 is structurally modified in a manner the pin 34 and the rod 31 are provided to the construction of other known boosters. The pin 34 and the rod 31 serve to transmit only the brake pedal depressing force to the master cylinder 1. Therefore, when the booster 40 malfunctions, the desired input/output characteristics are assured.

As described above, the first auxiliary piston 19 is a cylindrically shaped structure and is provided with the large diameter flange portion 19a. The front cylindrical portion 19g of the first auxiliary piston 19 is disposed in the rearward opening bore 12b of the second master piston 12 with the predetermined clearance. The rear cone-shaped table portion 19c of the first auxiliary piston 19 is disposed in the forward opening bore 20g of the second auxiliary piston 20 with a clearance. Therefore, the first auxiliary piston 19 is movable in the radial direction independent of the second master piston 12 and the second auxiliary piston 20. Further, the first auxiliary piston 19 is movable following the cylinder bore 10g of the cap 10. Therefore, the hydraulic pressure brake device according to the disclosed embodiment of the present invention is well suited to inhibiting or preventing resistance by sliding movement at the cylinder bore 10g to provide an improved construction having a relatively high degree of reliability.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

I claim:
1. A hydraulic pressure brake device comprising:
a master cylinder;
a brake operating member;
a master piston provided in the master cylinder and movable in a forward direction in response to an input force applied to the brake operating member, the master piston having an effective cross-sectional area;
boosting means provided between the master cylinder and the brake operating member to assist the movement of the master piston in response to the input force applied to the brake operating member;
a first auxiliary piston disposed rearwardly of the master piston in the master cylinder and having a larger effective cross-sectional area than the effective cross-sectional area of the master piston;
a pressure transmitting chamber disposed between the first auxiliary piston and the master piston;
valve means disposed in the first auxiliary piston for hydraulically sealing the pressure transmitting chamber when the movement of the master piston is assisted by the boosting means and for connecting the pressure transmitting chamber with a reservoir when the movement of the master piston is not assisted by the boosting means; and
a second auxiliary piston disposed between the first auxiliary piston and the boosting means for transmitting the boosting power generated by the boosting means to the first auxiliary piston when the movement of the master piston is assisted by the boosting means and for transmitting the input force applied to the brake operating member to the valve means to open the valve means when the movement of the master piston is not assisted by the boosting means.

2. The hydraulic pressure brake device according to claim 1, wherein a front portion of the first auxiliary piston is disposed in a rearward opening bore of the master piston with a gap, and a front end surface of the front portion of the first auxiliary piston contacts a bottom portion of the rearward opening bore of the master piston, and wherein a rear portion of the first auxiliary piston is disposed in a forward opening bore of the second auxiliary piston with a gap, and a rear end surface of the rear portion of the first auxiliary piston contacts a front end surface of the second auxiliary piston.

3. The hydraulic pressure brake device according to claim 1, further comprising:
first outputting means provided in the boosting means for transmitting the boosting power generated by the boosting means to the first auxiliary piston when the movement of the master piston is assisted by the boosting means; and
second outputting means provided in the second auxiliary piston for transmitting the input force applied to the brake operating member to the valve means and for opening the valve means when the movement of the master piston is not assisted by the boosting means.

4. The hydraulic pressure brake device according to claim 3, wherein the first outputting means is an output member and the second outputting means includes a pin and a rod.

5. The hydraulic pressure brake device according to claim 1, further comprising:
a retainer disposed in a forward opening bore of the second auxiliary piston and provided with a forward flange portion and a rearward flange portion;

a plunger having a front end provided with a flange portion disposed in the retainer, the plunger being axially and slidably movable relative to the retainer; and a return spring provided between a front surface of the flange portion of the plunger and a rear end surface of the forward flange portion of the retainer, the return spring having a predetermined installation length providing a predetermined installation load under non-braking condition.

6. A hydraulic pressure brake device comprising:

a master cylinder;

a brake operating member;

a master piston provided in the master cylinder and movable in a forward direction in response to an input force applied to the brake operating member, the master piston having an effective cross-sectional area and a rearwardly opening bore;

a vacuum booster provided between the master cylinder and the brake operating member to assist the movement of the master piston in response to the input force applied to the brake operating member;

a first auxiliary piston possessing a front portion disposed in the rearward opening bore of the master piston and having a larger effective cross-sectional area than the effective cross-sectional area of the master piston;

a pressure transmitting chamber defined between the first auxiliary piston and the master piston;

a valve member disposed in a bore in the first auxiliary piston and engageable with a valve seat when the movement of the master piston is assisted by the vacuum booster to hydraulically seal the pressure transmitting chamber and disengageable from the valve seal when the movement of the master piston is not assisted by the vacuum booster for connecting the pressure transmitting chamber with a reservoir; and a second auxiliary piston disposed between the first auxiliary piston and the vacuum booster to transmit the boosting power generated by the vacuum booster to the first auxiliary piston when the movement of the master piston is assisted by the vacuum booster and to transmit the input force applied to the brake operating member to the valve member to disengage the valve member from the valve seat when the movement of the master piston is not assisted by the vacuum booster.

7. The hydraulic pressure brake device according to claim 6, wherein a gap exists between an outer surface of the front portion of the first auxiliary piston and an inner surface of the rearward opening bore of the master piston.

8. The hydraulic pressure brake device according to claim 6, wherein the front portion of the first auxiliary piston includes a front end surface contacting a bottom portion of the rearward opening bore of the master piston.

9. The hydraulic pressure brake device according to claim 6, wherein the first auxiliary piston includes a rear portion disposed in a forward opening bore of the second auxiliary piston with a clearance, the rear portion of the first auxiliary piston having a rear end surface contacting a front end surface of the second auxiliary piston.

10. The hydraulic pressure brake device according to claim 6, wherein the vacuum booster includes an output member that transmits the boosting power generated by the vacuum booster to the first auxiliary piston when the movement of the master piston is assisted by the vacuum booster.

11. The hydraulic pressure brake device according to claim 6, including a pin and a rod provided in the second auxiliary piston for transmitting the input force applied to the brake operating member to the valve member to disengage the valve member from the valve seat when the movement of the master piston is not assisted by the vacuum booster.

12. The hydraulic pressure brake device according to claim 6, including a retainer disposed in a forward opening bore of the second auxiliary piston, the retainer having a forward flange portion and a rearward flange portion.

13. The hydraulic pressure brake device according to claim 12, including a plunger disposed in the retainer, the plunger being axially and slidably movable relative to the retainer and having a front end provided with a flange portion.

14. The hydraulic pressure brake device according to claim 13, including a return spring positioned between a front surface of the flange portion of the plunger and a rear end surface of the forward flange portion of the retainer.

15. The hydraulic pressure brake device according to claim 6, wherein the master piston is one master piston and including another master piston disposed in the master cylinder forward of the one master piston.

* * * * *